UNITED STATES PATENT OFFICE.

MARTIN HAHN, OF MUNICH, GERMANY.

PRODUCTION OF FERMENTED BEVERAGES.

SPECIFICATION forming part of Letters Patent No. 717,744, dated January 6, 1903.

Application filed September 15, 1900. Serial No. 30,147. (No specimens.)

*To all whom it may concern:*

Be it known that I, MARTIN HAHN, a subject of the King of Prussia, German Emperor, residing at Arcisstrasse 30, Munich, Germany, have invented certain new and useful Improvements in the Production of Fermented Beverages; and I do hereby declare the following to be a full, clear, and exact description of the invention, such as will enable others skilled in the art to which it appertains to make and use the same.

The object of my invention is to produce a fermented durable beverage with a high proportion of albumen in solution.

In making fermented beverages it has hitherto been usual to separate the albumen, or to peptonize the same by boiling the liquid containing the albuminous substances, or to add antiseptic substances.

According to the present invention I take a fermentable vegetable liquid which when fermented alone yields a beverage of pleasant taste—such as hopped beer-wort, for example—and I add to it, after cooling, from a quarter up to an equal volume of a solution which contains five per cent. to twenty per cent. of animal albumens, from which solutions the albumen can be precipitated by boiling without any addition of an acid or a salt or the like. Such albumens are blood, blood-serum, white of egg, or solutions of albumen which may be obtained from these liquids. I then add yeast and allow the mixture to ferment at a low temperature without boiling and without the addition of antiseptic substances. My invention does not apply, however, to the use of milk. From milk the albumen is not precipitated by mere boiling, but by addition of an acid or a salt. Instead of hopped beer-wort there may be employed, if desired, fruit-must—such, for example, as apple-must, wine-must, and the like. The finished product represents always a slightly alcoholic nutritious beverage with a high percentage of free animal albumen in solution of as great keeping power as sterilized beer or the like, provided that it is stored in air-tight tuns, bottles, or the like.

In carrying out my invention blood from all kinds of animals may be employed, seeing that the specific substances which produce the smell and taste of the different sorts of blood are so changed by the fermentation that the blood of buck goats, for instance, becomes free from taste and smell.

By way of example I may state that ten liters of defibrinated blood of cows or oxen may be well mixed with ten liters of beer-wort, and then there is added thereto one liter of common fresh beer-yeast and the whole again well mixed. The mixture thus obtained is first allowed to remain in an open vessel about seven days at a temperature of about 5° Celsius. It is then decanted or otherwise separated from the deposit, and it is then put into a closed vessel, from which after four to six weeks it is bottled. If desired, the finished product may be treated with carbonic acid under pressure.

The advantages of my product above other sorts of beer, for instance, are as follows: First, the high nutritive value of the said product, as eight per cent. and over of albumen, is present in a dissolved form; second, the small amount of alcohol contained therein, (in beer, *e. g.*, not above two per cent.) The advantages as against other albumen preparations consist of, first, the facility of assimilation of the product due to the solubility, and, secondly, the cheapness of the product. As compared with fresh animal-albumen solutions the advantages consist in the keeping property of the product in spite of its liquid form, whereas liquid blood, for instance, decomposes usually in twenty-four to forty-eight hours if it is not rendered aseptic. It has, moreover, the advantage of a good taste and an acceptable form of the food product.

My process allows egg and blood albumen in solution to be brought to a permanent and directly-utilizable form without employing the ordinary means of preservation.

I claim as my invention—

1. The process described for the production of fermented durable beverages with a high proportion of animal albumen in solution, said process consisting in allowing fermentable vegetable liquids to ferment at low temperature with an animal-albumen solution of the character described and from which the albumen can be precipitated by boiling, all substantially as set forth.

2. Process for the production of fermented durable beverages with a high proportion of animal albumen in solution, said process consisting in adding blood to already hopped and cooled beer-wort, then adding yeast and allowing the mixture to ferment at low temperature, substantially as set forth.

3. Process for the production of fermented durable beverages containing a high proportion of animal albumen in solution, said process consisting in adding blood to already hopped and cooled beer-wort, then adding yeast, allowing the mixture to ferment at low temperature and then treating the thus-treated liquid with carbonic acid, substantially as set forth.

4. As a new product and new article of food, a highly-albuminous but slightly-alcoholic nutritious beverage of great keeping power consisting of a fermented liquid mixture of fermentable vegetable liquids and animal-albumen solution of the character described and from which the albumen can be precipitated by boiling, substantially as set forth.

In testimony whereof I affix my signature in presence of two witnesses.

MARTIN HAHN.

Witnesses:
  AMALIA PETER,
  VINCENT FULLER.